Figure 1:
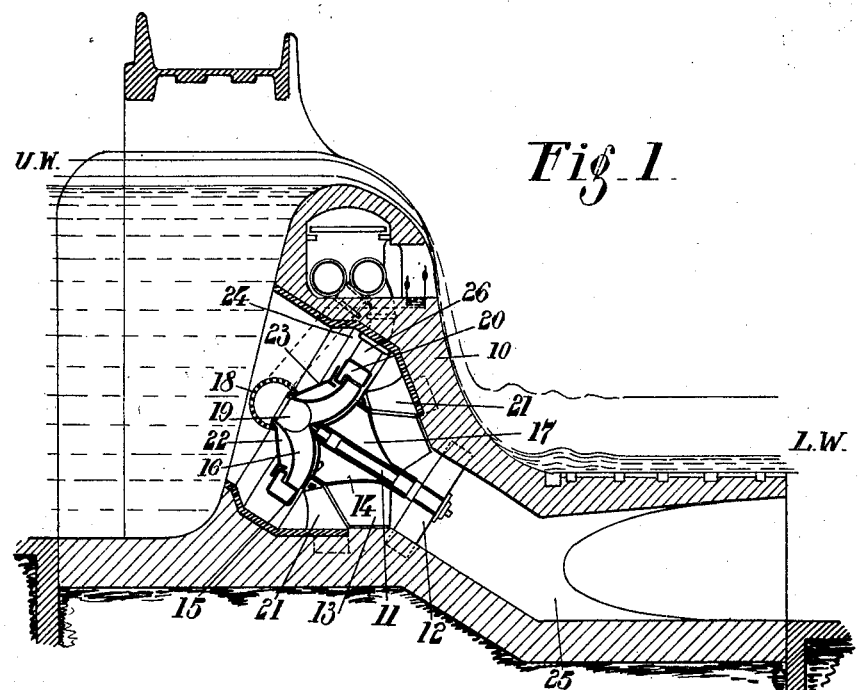

Oct. 8, 1929.  F. LAWACZECK  1,730,578

UTILIZATION OF HYDRAULIC ENERGY

Filed Aug. 24, 1921

Inventor:
Franz Lawaczeck
By Attorney.

Patented Oct. 8, 1929

1,730,578

UNITED STATES PATENT OFFICE

FRANZ LAWACZECK, OF POCKING, GERMANY, ASSIGNOR TO WORTHINGTON PUMP AND MACHINERY CORPORATION, OF NEW YORK, N. Y., A CORPORATION OF VIRGINIA

UTILIZATION OF HYDRAULIC ENERGY

Application filed August 24, 1921, Serial No. 494,893, and in Germany December 21, 1918.

(GRANTED UNDER THE PROVISIONS OF THE ACT OF MARCH 3, 1921, 41 STAT. L., 1313)

My invention relates to the utilization of low head hydraulic energy. By utilizing such low head energy, very much power might be made available, if low head plants were not too costly when constructed like plants for medium heads. Heads, which are obtained in developing a river in order to render it navigable, though the quantity of water is considerable, are too low to be utilized in power plants, for the turbines would have a very low velocity and therefore be very cumbersome and heavy like their generators. Owing to the considerable space required and the high cost of such a plant, the initial costs would be so high that it would be cheaper to generate the current by steam power.

Heretofore, it has generally been attempted to increase the head by constructing along the river a canal of very small slope and making this canal so long, that the difference between the levels of the river and the canal, that is, the head is such that it is possible to build a turbine plant to advantage. Such a canal is, however, very expensive, the more so, the longer it is, as with the slope obtained the sections of dams and the height of inclines holding the canal are increased. Such a plant is only practicable if the initial costs per horse-power are a minimum for a given length of canal. The power plant will yield a higher total output with increasing head so that the initial cost per horse-power will be reduced in proportion.

I succeed in still considerably reducing this minimum of initial cost by utilizing the low heads which are obtained in connection with the locks constructed in the river bed for navigation purposes, I achieve this by directly connecting a low pressure turbine which is operated by the small head of a lock or dam with a rotary pump which supplies a correspondingly smaller quantity of river water under higher pressure to a second high pressure turbine plant. I may distribute such units of low pressure turbines and rotary pumps along the entire length of a lock or dam, so that the entire quantity of water supplied by the river is utilized in them. The water supplied by the pumps is preferably conducted to the high pressure power plant by one or more pressure pipes. The turbines and generators of the power plant can now be constructed at much lower initial costs owing to the much smaller quantity of water with which they are operated and the considerably increased pressure head, the initial costs being less than with the most favorable plant used in connection with a canal, for the costs of the means for transforming the head according to my invention are not by far as high as those of the canals in ordinary power plants. Moreover, such a canal could never attain the high head which is produced by the pumps which are connected with low pressure turbines according to my invention. The dam, which must be built in any case as it is indispensable for the lock and consequently for navigation, can be constructed at much less cost owing to the low pressure turbine units being arranged within it, as compared with a solid dam extending across the entire river, the lateral walls of the chambers for the turbines and pumps considerably strengthening the dam.

My invention is of equal advantage for navigation and for the utilization of the power plants, in contra-distinction to a plant comprising a canal which could be utilized for the purpose of navigation only with considerable difficulties and costs, but will never carry the entire quantity of the river water, as it is imperative that a certain quantity of water, which is often considerable should remain in the old river bed. This quantity means a loss in the total efficiency of the canal plant, which is much higher than the losses of efficiency occasioned by the energy losses of the low pressure turbines and centrifugal pumps according to my invention.

Figure 2:
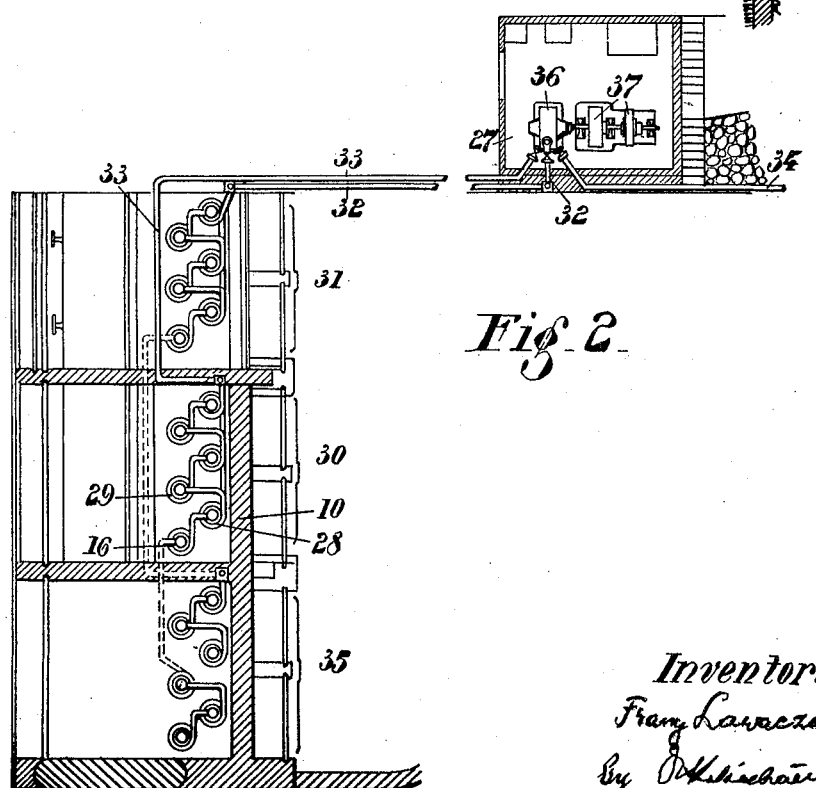

In the drawings annexed to this specification and forming part thereof, a favorable combination of low pressure turbines and rotary pumps and a power plant embodying my invention are illustrated diagrammatically by way of example. In the drawings Fig. 1 is a vertical longitudinal section of a low pressure turbine and rotary pump combined therewith, the whole being arranged in a dam, and Fig. 2 is a diagram of the power plant.

Preferably the units are arranged directly within a dam 10 and distributed close to one another across the entire length of the dam. The shaft 11 of the unit is preferably fixed in a base 12 which is secured in the concrete forming the overfall and the base of the dam. The rotary part of the unit is placed on the shaft 11, the back 14 of the turbine runner 13 preferably adjoining the rear face 15 of the pump runner. A chamber 17 between the turbine and the pump is sealed and kept filled with air in order to act as a float. Preferably, the volume of said chamber is such, that the entire runner body is balanced by its buoyancy. This greatly reduces the stress on the bearings and prolongs their life.

The water for the pumps 16 passes a sieve 18 and gets to the central opening 19 of the pump the blades of which are marked 16. The pump forces the water into a spiral casing 20, which, like the adjacent guiding vanes 21 for the turbine 13, is inserted in the dam 10. The pump chamber 22 is closed by a cover 23 at the inlet side. When this cover is removed, the rotary part of the unit can be removed from the stationary shaft 11.

The inclined arrangement of the shaft in the example illustrated renders it possible to provide inclined guide rails for the revolving part of the unit, so that it can be raised above the water. By arranging the shaft 11 at an angle and parallel to the water current, the resistance which the unit opposes to the flow of water, is greatly reduced. Obviously the section of the dam favours a suitable arrangement of the supply passages 24 to the turbines and only a very short, comparatively straight tail race 25 is required.

The water collected in the spiral casing 20 of the pump 16 is now supplied under high pressure to a pipe 26 which conveys it to a second, third, etc. pump 28, 29, etc. (Fig. 2) in order to further increase the pressure. Instead of connecting all the pumps in series, so that the water discharged by one pump enters the suction chamber of the next pump, the pumps of a plurality of low pressure units may be connected in series and the water under pressure which is supplied by these groups of units 30 or 31, respectively, may be supplied to the power plant 27 through separate pipes 32 and 33, that is, in parallel, so that the water jets supplied by these groups 30 and 31 are united only after each group 30 or 31, respectively, has attained its maximum pressure. In the same manner, the water under pressure supplied by several turbine plants arranged in a plurality of dams in a river can be conveyed to a common power plant 27, either in series or, as indicated in Fig. 2 by combining the water flowing at high pressure in the pipes 32 and 33 with high pressure pump water from a plant in a dam farther down the river which is supplied to the power plant 27 through a pipe 34.

In order to utilize also the high water levels by means of low pressure turbines, preferably units 35 are arranged in the dam which are idle under normal conditions but which cooperate with units 30, 31 at high water. If the pumps of this group 35 are connected in series with the pumps for normal water levels, (groups 30, 31) the loss of head produced by the high water level may be balanced, so that the pressure in the pipes 32, 33 or 34 is approximately constant at all times. In any case, a regulation of the pressure in the water supplied to a power plant can be effected without any difficulty by connecting the pumps of the head transformers in parallel or in series.

In a plant according to my invention the water which is supplied to the power plant 27 through pipes 32 and 33, respectively, can be under so high a pressure, that it is possible to utilize it in a comparatively cheap and rapidly rotating Pelton turbine 36, which is directly coupled with a comparatively small generator 37.

I wish it to be understood that I do not desire to be limited to the exact details of construction shown and described, for obvious modifications will occur to a person skilled in the art.

I claim:

1. In a hydraulic plant for utilizing the energy of water-falls of low heads, the combination, with a high pressure turbine arranged to deliver mechanical power, of a plurality of rotary pumps connected in series to deliver water at high pressure to the high-pressure turbine, and a plurality of low-pressure turbines, one for each rotary pump, each low pressure turbine being arranged to be driven by water from the low-head falls and being directly connected to its respective pump.

2. Hydraulic power system comprising a turbine and primary pump unit, a secondary pump, a low pressure turbine arranged to drive the secondary pump, a connection between the pressure side of said primary pump and the suction side of said secondary pump whereby the relatively low pressure is built up to relatively high pressure, and a power plant connected with and adapted to be operated by water from the cumulative pressure from said secondary pump to thereby transform low pressure and velocity into high pressure and velocity.

3. In a hydraulic power plant, the combination with a dam, of a plurality of sets of pumping units located in said dam, each pumping unit comprising a low pressure turbine and a rotary pump driven by said turbine, the rotary pumps of said sets being connected in series to produce a high pressure, and a high pressure turbine arranged to be operated directly by the discharge from the said rotary pumps, and a generator directly operated by said high pressure turbine.

In testimony whereof I affix my signature.

FRANZ LAWACZECK.